Patented May 18, 1943

2,319,719

UNITED STATES PATENT OFFICE 2,319,719

NEW VAT DYESTUFFS

Willy Burneleit, Cologne-Deutz, Germany, assignor to General Aniline & Film Corporation, a corporation of Delaware No Drawing. Original application November 26, 1937, Serial No. 176,623. Divided and this application September 13, 1940, Serial No. 356,662. In Germany December 3, 1936

4 Claims. (Cl. 260—315)

The present invention relates to a new process of preparing quinones of the carbazole series and to the new products obtainable thereby.

One object of my present invention is the development of a new process which can be applied generally to the preparation of quinones of the carbazole series. Another feature of my invention resides in the preparation of new vat dyestuffs. Other objects of my invention will be apparent from the following description and claims.

It has been found that quinones of the carbazole series can be prepared by causing naphthoquinones to react at an elevated temperature upon such 1.2.3-triazoles as are derived from aromatic o-diamines, nitrogen being split off in the course of the reaction. The 1.2.3-triazoles can be prepared in the usual manner from aromatic o-diamines and nitrous acid. As aromatic 1.2.3-triazoles there come into consideration, for instance, those derived from phenylenediamine, naphthylenediamine, 1.2-diamino-4-benzamido-anthraquinone, 3.4-diaminodiphenyl, 3.3'-diaminobenzidine and substitution products thereof. One molecule of a triazole derived from a compound, such as 3.3'-diaminobenzidine, is capable of reacting with two molecules of a naphthoquinone, it being to be understood that such a process as well as the final products, which are obtainable thereby, are intended to fall within the scope of my invention.

The products thus obtained correspond to the type I in case the starting material is an α-naphthoquinone and to the type II if the starting material is an β-naphthoquinone.

I 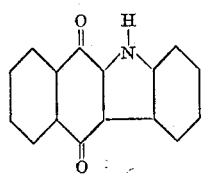

II 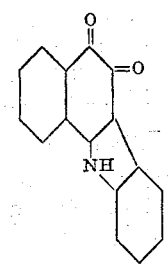

As naphthoquinones there may also be employed those β-naphthoquinones having a free 3-position and having in 4-position a substituent which is capable of being replaced by amines. Such a substituent is, for instance, the sulfonic acid radical. The benzene nucleus of the naphthoquinones as well as the said 1.2.3-triazoles may contain various substituents. Such substituents are, for instance, halogen atoms, alkyl, oxyalkyl, alkoxy, amino, nitro, carboxyl, acetyl, acetylamino and phenyl groups.

If working under mild conditions there can be obtained intermediate compounds which still contain the whole nitrogen and can be changed into the final products by heating. In some cases the addition of an oxidizing agent may be advantageous.

Another object of my invention resides in the new compounds which are obtainable by my new process. As parts of the compounds described herein have already been prepared according to other methods, I confine myself to claim as new products the compounds of the following formula

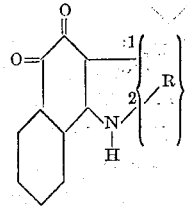

wherein R stands for an aromatic radical and wherein the bonds 1 and 2 are attached to adjacent positions of the aromatic radical. As such radicals there may be mentioned, for instance, benzene, naphthalene, diphenyl anthraquinone and substitution products thereof.

The compounds obtainable according to the present invention are vat dyestuffs for wool or cotton and yield dyeings of very good fastness properties.

The following examples illustrate the invention without being restricted thereto the parts being by weight:

Example 1

16 parts of α-naphthoquinone, 12 parts of 1.2.3-benzotriazole and 60 parts of nitrobenzene are boiled for 75 minutes, nitrogen being developed. After cooling, the product is filtered by suction and recrystallized from o-dichlorobenzene. The product forms yellow lancets and is identical with the 2.3-benzo-carbazole-quinone-1.4, which is obtainable according to U. S. P. 1,763,216.

Example 2

16 parts of β-naphthoquinone, 12 parts of 1.2.3-benzotriazole and 60 parts of nitrobenzene are heated while stirring. A vivid evolution of gas takes place at a temperature of 160–170°. The product separates in large brown crystals. It dissolves with a brown coloration in sulfuric acid and also in alcoholic caustic potash solution. Wool is dyed from the vat brown shades.

Example 3

27 parts of the potassium salt of β-naphthoquinone-4-sulfonic acid, 12 parts of 1.2.3-benzotriazole, 10 parts of potassium acetate and 200 parts of cyclohexanol are boiled for 2 hours while stirring. The product is filtered by suction at 80°. It is identical with the product according to Example 2.

Example 4

9 parts of β-naphthoquinone, 4.8 parts of an azimido compound from 1.2-napththylenediamine (and having the follow structure:

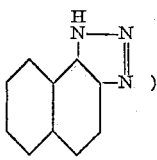

and 60 parts of nitrobenzene are heated to 150–160° while stirring. Nitrogen develops and after a short time the product having the following structural formula:

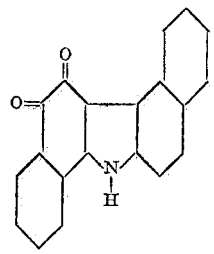

separates in the heat in form of brown needles. Wool is dyed from the vat vivid olivish brown shades of excellent fastness properties.

Example 5

10 parts of an azimido compound from 4-chloro-1.2-phenylenediamine (and having the following structure:

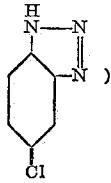

and 80 parts of nitrobenzene are heated to about 150°, and then are added while stirring 15 parts of β-naphthoquinone. Nitrogen develops and the temperature rises to about 180°. The product having the following structural formula:

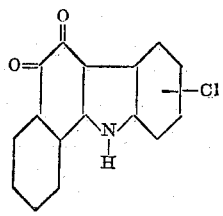

separates in a crystalline form. It dyes wool from the vat vivid brown shades.

Example 6

9.5 parts of an azimido compound from 1.2-diamino-4-benzamido-anthraquinone (and having the following structure:

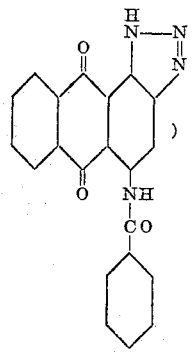

and 100 parts of nitrobenzene are heated to boiling while stirring. Then 10 parts of β-naphthoquinone are added in small portions and the mixture is heated until the nitrogen development has ceased. The product separates in reddish-brown small needles. It dissolves in sulfuric acid with a dull violet color, and dyes cotton from the vat orange-brown shades.

Example 7

16 parts of an azimido compound from 3.4-diamino-benzoic acid (and having the following structure:

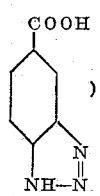

and 150 parts of nitrobenzene are heated to boiling. 32 parts of β-naphthoquinone are slowly added. The product already separates in the heat. It forms brown crystals which dissolve in an aqueous solution of caustic soda with a brown coloration.

Example 8

16 parts of an azimido compound from 4-nitro-1.2-phenylenediamine (and having the following structure:

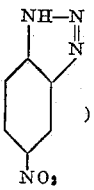

and 150 parts of nitrobenzene are heated to boiling. 32 parts of β-naphthoquinone are added while stirring. The product crystallizes out in the heat in form of brown crystals.

Example 9

If α-naphthoquinone is applied instead of β-naphthoquinone in Example 8 a product is obtained which crystallizes from nitrobenzene in yellow needles.

Example 10

10 parts of an azimido compound from 3.4-diaminodiphenyl (and having the following structure:

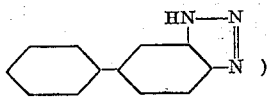

and 100 parts of nitrobenzene are heated until boiling. Then 16 parts of β-naphthoquinone are slowly added. After cooling alcohol is added and sucked off. The product having the following structural formula:

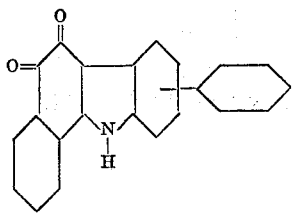

crystallizes from nitrobenzene in small dregs. It dyes wool from the vat vivid brown shades.

Example 11

5 parts of an azimido compound from 3.3'-diamino-benzidine (and having the following structure:

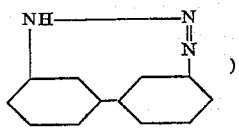

and 60 parts of nitrobenzene are heated to boiling. Then 15 parts of β-naphthoquinone are added and the mixture is boiled until the evolution of nitrogen has ceased. After cooling the product is filtered. It dyes cotton from the vat reddish-brown shades.

Example 12

9.5 parts of an azimido compound from 1.2-diamino-4.6-dichlorobenzene (and having the following structure:

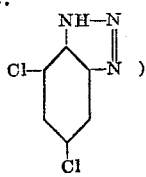

and 75 parts of nitrobenzene are heated to boiling. 16 parts of β-naphthoquinone are added. The dyestuff crystallizes in reddish-brown crystals. It dyes wool from the vat reddish-brown shades.

Example 13

10 parts of an azimido compound from 4-chloro-1.2-naphthylenediamine (and having the following structure:

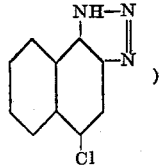

and 150 parts of nitrobenzene are heated to boiling. 16 parts of β-naphthoquinone are slowly added. The product separates in the heat in form of large needles. It dyes wool from the vat vivid olivish-brown shades.

Example 14

15.8 parts of β-naphthoquinone, 12 parts of 1.2.3-benzotriazole, 24 parts of lead dioxide and 150 parts of glacial acetic acid are heated while stirring. After shortly heating the mixture the intermediate separates in yellow needles. Then 100 parts of glacial acetic acid are added. Upon further heating a vivid development of gas takes place, the yellow product dissolves and the brown carbazole derivative separates. After two hours the reaction is complete. The product is identical with the product obtained according to Example 2.

Example 15

8.5 parts of 8-chloro-α-naphthoquinone, 6 parts of benzotriazole, 20 parts of glacial acetic acid, 100 parts of a saturated ferrous chloride solution and 100 parts of water are boiled for 5 hours while stirring. The yellow precipitation thus obtained is sucked off. The product crystallizes from chlorobenzene in orange-yellow dregs. In order to convert it into the carbazole derivative there are heated 7.2 parts of this intermediate product with about 20 parts of diphenylether. At 240° development of gas takes place. The product is sucked off and crystallized from nitrobenzene. There are formed red needles, which dissolve in sulfuric acid with violet-red color, in alcoholic caustic potash solution with brown color.

Example 16

7.8 parts of an azimido compound from 2.3-naphthylenediamine (and having the following structure:

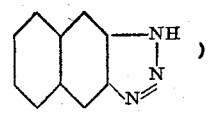

12 parts of β-naphthoquinone and 120 parts of nitrobenzene are slowly heated to boiling while stirring and kept one hour at this temperature. The product separates in brown tables. It dissolves in sulfuric acid with blue color, and in pyridine water to which some caustic soda lye is added with a violet color. It dyes wool from the vat violet-brown shades.

Example 17

6 g. of an azimido compound from the diamine of the formula:

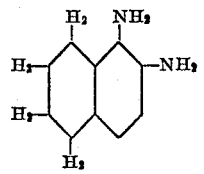

(and having the following structure:

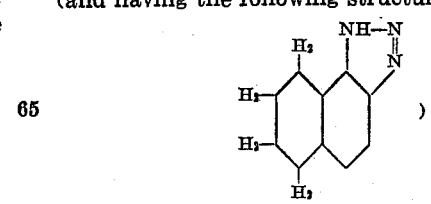

11 parts of β-naphthoquinone and 60 parts of nitrobenzene are boiled until the development of gas has ceased. The product separates in the heat in brown lancets. It dissolves in sulfuric acid with violet color and in pyridine to which some caustic soda lye is added with bordeaux-red color. Wool is dyed from the vat vivid brown shades.

Example 18

16.3 parts of an azimido compound from 4-ethoxy-1.2-phenylenediamine (and having the following structure:

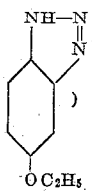

)

32 parts of β-naphthoquinone and 120 parts of nitrobenzene are boiled until the product is separated. It dyes wool from the vat reddish-brown shades.

Example 19

11.9 parts of 7-acetylamino-1.2-naphthoquinone, 8.5 parts of an azimido compound from 1.2-naphthylenediamine (see Example 4) and 100 parts of nitrobenzene are stirred for 20 minutes at a temperature of 110–120°. Then the mixture is slowly heated to 180°, at which temperature a vivid development of gas takes place. At the same time the dyestuff separates in large brown tables. The product dyes wool from the vat greenish-grey shades.

This application is a division of application Ser. No. 176,623, Patent 2,242,449.

I claim:

1. The products of the following formula:

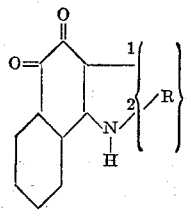

wherein R stands for an aromatic radical selected from the group consisting of benzene, naphthalene, diphenyl, and anthraquinone radicals, and the substitution products thereof, and wherein the bonds 1 and 2 are attached to adjacent positions of the aromatic radical.

2. A product of the class consisting of those having the formula:

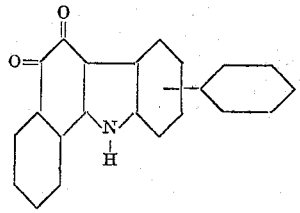

3. The product of the formula:

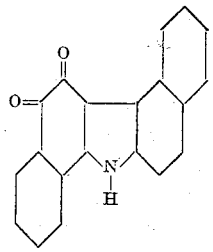

4. A product of the class consisting of those having the formula:

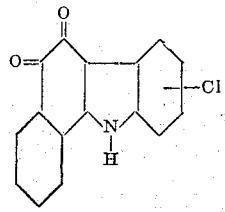

WILLY BURNELEIT.